(No Model.)

W. H. BAKER.
ELECTRICAL INDICATOR AND ALARM.

No. 291,484. Patented Jan. 8, 1884.

ATTEST:
J. A. Hurdle
A. D. Brewer

INVENTOR:
Wm. H. Baker,
by Wm. B. Vansize,
Attorney.

UNITED STATES PATENT OFFICE.

WILLIAM H. BAKER, OF BROOKLYN, NEW YORK.

ELECTRICAL INDICATOR AND ALARM.

SPECIFICATION forming part of Letters Patent No. 291,484, dated January 8, 1884.

Application filed May 18, 1883. (No model.)

*To all whom it may concern:*

Be it known that I, WM. H. BAKER, a citizen of the United States, residing in the city of Brooklyn, county of Kings, and State of New York, have invented certain new and useful Improvements in Electrical Indicators and Alarms, of which the following is a specification.

The object of my invention is to automatically designate or indicate at which one of a series of points or stations electrically connected therewith a break in the normally-closed circuit has occurred, and is applicable to the purposes of a burglar-alarm, an annunciator, or similar device.

My invention comprises a normally-closed electric circuit extending through an electro-magnet at the indicator and each and all of the indicating-points or circuit-breakers, in combination with an indicator composed of a ring or disk formed of segments or sections of metal in close proximity, but insulated from each other, and in number at least one in excess of the number of indicating-points or circuit-breakers. From a point in the said electric circuit between each circuit-breaker and the one immediately adjoining a normally-open branch of the above-mentioned circuit is connected to one of the said sections. The next section in order is connected to the next branch, and so on in succession. A radial arm having two fingers or contact-points riding upon the face of the disk is rotated by a clock-work normally held in check by the electro-magnet. If, now, the circuit be broken at any circuit-breaker, the electro-magnet releases this arm, which in its rotation connects one section of the disk after another with the one immediately adjoining, and a short circuit is thus formed round each circuit-breaker in succession until that point where the circuit is broken has been reached, when the arm is stopped by the return of the electro-magnet to its normal position. A pointer moving with the rotating arm indicates on a dial the point where circuit was broken, and an alarm-bell calls attention to the operation of the indicator.

Figure 1:
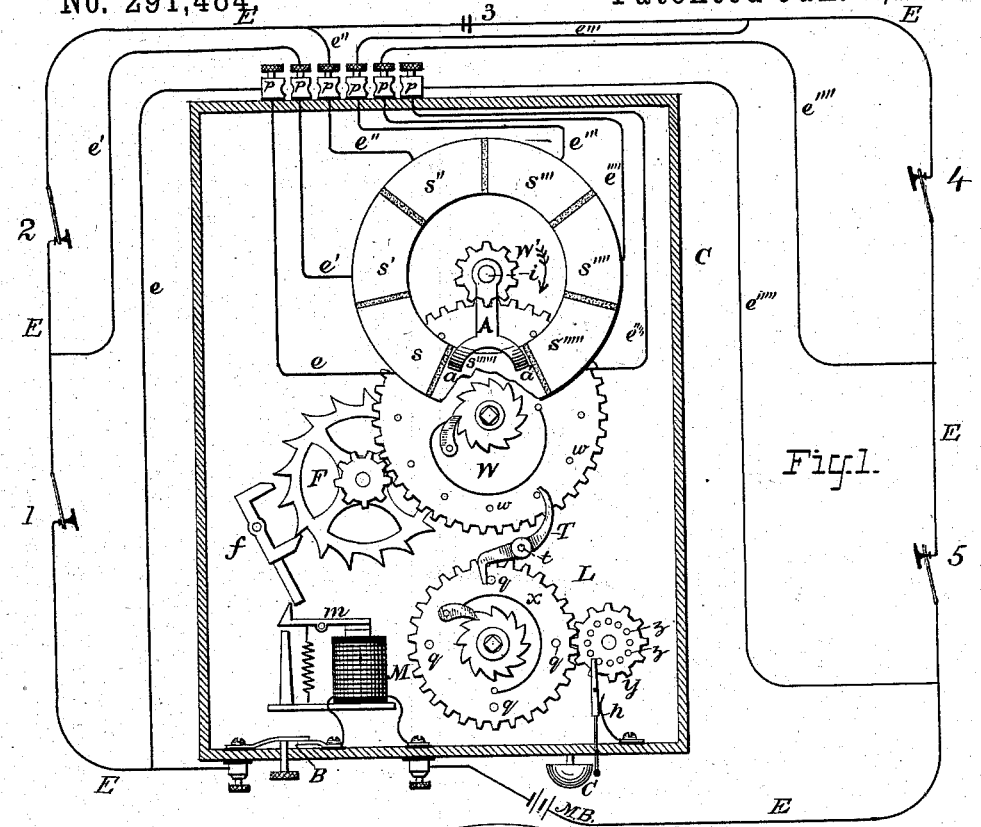
Figure 2:
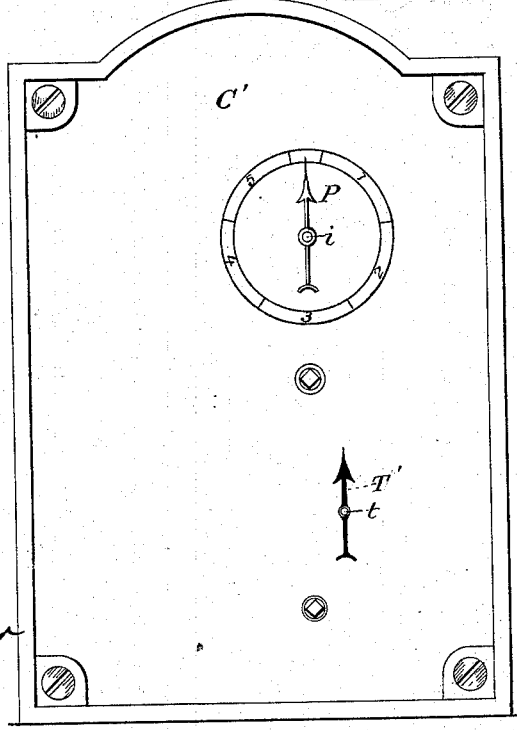

Referring to the drawings, Figure 1 is a complete plan view of my indicator and alarm with its electrical connections. Fig. 2 is a view of the case-cover, showing the dial and pointer and the arm for setting the alarm.

An electrical conductor, E, extends from the electro-magnet M at the indicator through main battery M B and each circuit-breaker 1 2 3, &c., and through a circuit-breaker, B, which is normally closed, thus forming a complete closed circuit; but it is to be observed that the ground may be used for a portion of the circuit, if desired. $s\ s'\ s''$, &c., are a series of metallic segments or curved sections placed in proximity, in number at least one in excess of the number of circuit-breakers. They are insulated from each other and from the remainder of the mechanism, and altogether form a disk or ring. From points in the conductor E between each circuit-breaker and the one immediately adjoining it a branch is connected to a corresponding section of the disk. From between circuit-breakers 1 and 2 branch $e'$ is connected to section $s'$. From between points 2 and 3 branch $e''$ is connected to the next section in order, $s''$. Each branch is connected through one of a series of screw-cups, $p$, and the series of screw-cups $p\ p$ are so situated with reference to each other and are so shaped that a metallic switch-pin may be placed between any two screw-cups, by which means any circuit-breaker may be short-circuited.

W W' represent a train of clock-work, which may be driven by a weight or spring. At the center of the ring an arm, A, is attached to the shaft $i$, upon which is also placed the last wheel of the train of clock-work, by which means a constant tendency to rotation is imparted to arm A. The outer end of arm A is divided into two points or fingers, $a\ a'$, which are in contact with the surface of the ring, substantially as shown. The clock-work is held in check by armature $m$ of electro-magnet M, which in its normal position arrests fly $f$ of escapement F $f$; but when circuit through M is broken allows $f$ to play freely.

L is a mechanical alarm consisting of wheel $x$, driven by a weight or spring, which wheel gears into wheel $y$.

Upon the surface of wheel $y$ is a series of pins, $z\ z$, which, as said wheel revolves by the aid of spring $h$, cause a succession of strokes on the bell $c$ to be given.

T is a curved lever, pivoted at $t$, one end of which is hooked to engage with one of a series of pins, q, upon the face of wheel x, by which means the alarm L is held in a state of rest. The opposite end of lever T is curved, and when the hooked end is caught upon pin q the curved end is in the path of a series of pins, w w, on wheel W, one of which pins w, immediately upon the starting of wheel W, will strike lever T and turn its hooked end away from pin q on wheel x, whereupon the alarm will start into action and so continue until stopped by an attendant. The whole mechanism is inclosed in a case, C, shown in cross-section.

Fig. 2 shows the case-cover, upon which is a dial with characters indicating the various indicating-points. A pointer, P, upon the same shaft bearing arm A, indicates the point at which circuit has been broken, normally resting at a set-point. An arm, T', fixed to arbor t, upon which lever T is placed, is for the purpose of setting the alarm after it is wound and the instrument has been set ready for action.

The device operates as follows: The parts are shown in their normal or set position. Suppose circuit-breaker 3 to break the circuit E at 3. Armature m of magnet M is thrown into a retracted position, and the clock-work starts, rotating arm A in a direction from left to right. One of the series of pins w on wheel W strikes the curved end of lever T and forces its hooked end from pin q of wheel x, whereupon the alarm starts into action. The arm A, in its rotation, after leaving the blank or extra section $s''''''$, upon which it normally rests, passing over section s, arrives at a point where the finger a is in contact with section $s'$ and $a'$ in contact with section s, a short circuit being thus formed round circuit-breaker 1 via the elements $e \; s \; a' \; a \; s' \; e'$. This, however, does not close the circuit, and the arm continues in its rotation, cutting out each circuit-breaker until it arrives at that one where circuit is open. As soon as the short circuit is formed round this circuit-breaker—in the present case 3—the circuit immediately resumes its normal condition, the clock-work stops, and the pointer P indicates on the dial the number 3 as the place where an interruption has occurred.

To stop the alarm and again set the indicator, the button B is depressed, breaking the circuit, which is kept open till the pointer P indicates that the set position has been arrived at. The mechanical alarm is then stopped by turning the arm T to its set position, which causes the hooked end of lever T to again engage one of the series of pins q on wheel x, and the indicator is ready for further action. If the circuit remains open at any circuit-breaker, or if it becomes desirable to remove any circuit-breaker from communication with the indicator, a metallic pin or plug may be placed between the appropriate posts p p.

In an application for United States Letters Patent executed April 27, 1883, I have shown an electro-magnetic alarm applied under similar circumstances, which may be substituted for the mechanical alarm shown in this case, if it is desired.

Modifications in the mechanical construction of parts may suggest themselves; but

What I claim, and desire to secure by Letters Patent, is—

1. In an electrical indicator, the combination of a normally-closed electrical circuit containing the coils of an electro-magnet, two or more circuit-breakers located at different points in the circuit, and means for automatically short-circuiting each circuit-breaker in succession.

2. In an electrical indicator, the combination of a normally-closed electrical circuit having a series of normally-open branches, a series of circuit-breakers located at various points in the circuit, an electro-magnet located at the indicator, and means for automatically short-circuiting each of said circuit-breakers in succession.

3. The combination, in an electrical indicator, of a normally-closed circuit having a series of normally-open branches, a series of circuit-closers located at various points in said circuit, an electro-magnet in said circuit at the indicator, a conducting-ring composed of a series of insulated sections, and a motor-driven radial arm normally held in check by the said electro-magnet.

4. The combination, in an electrical indicator, of a normally-closed electrical circuit having a series of normally-open branches, a series of circuit-closers located at various points in the circuit, an electro-magnet at the indicator, means for short-circuiting each circuit-closer in succession, and an automatic alarm.

WM. H. BAKER.

Witnesses:
WM. B. VANSIZE,
A. R. BREWER.